United States Patent [19]
Ohshita

[11] Patent Number: 5,461,442
[45] Date of Patent: Oct. 24, 1995

[54] ZOOM CAMERA

[75] Inventor: Kohichi Ohshita, Tokyo, Japan

[73] Assignee: Nikon Corporation, Tokyo, Japan

[21] Appl. No.: 119,858

[22] Filed: Sep. 13, 1993

[30] Foreign Application Priority Data

Sep. 11, 1992 [JP] Japan .................... 4-269617

[51] Int. Cl.$^6$ .............. G03B 1/18; G03B 13/14
[52] U.S. Cl. .................. 354/195.1; 354/221
[58] Field of Search ............ 354/195.1, 195.11, 354/195.12, 187, 188, 221, 222, 223, 286, 288

[56] References Cited

U.S. PATENT DOCUMENTS

| | | | |
|---|---|---|---|
| 5,056,903 | 10/1991 | Nakamura et al. | 359/513 |
| 5,117,247 | 5/1992 | Nakai et al. | |
| 5,173,726 | 12/1992 | Burnham et al. | 354/187 |
| 5,214,462 | 5/1993 | Haraguchi et al. | 354/187 |

FOREIGN PATENT DOCUMENTS

| | | |
|---|---|---|
| 59-17540 | 1/1984 | Japan . |
| 62-276531 | 12/1987 | Japan . |
| 63-34524 | 2/1988 | Japan . |
| 63-34526 | 2/1988 | Japan . |
| 63-34525 | 2/1988 | Japan . |

*Primary Examiner*—Michael L. Gellner
*Assistant Examiner*—N. Tuccillo
*Attorney, Agent, or Firm*—Keck, Mahn & Cate

[57] ABSTRACT

A compact zoom camera includes an automatic parallax correction mechanism. The zoom camera includes a first optical system for phototaking including a plurality of optical lens groups, a finder optical system arranged along an optical axis which is different and spaced apart from the optical axis of the first optical system, a first moving mechanism for moving at least a part of the optical lens groups for zooming purposes, and a second moving mechanism for moving at least a part of the optical lens groups in a direction inclined at a predetermined angle with respect to the optical axis of the first optical system for focusing purposes independently of the first moving mechanism. The angle is preset so as to correct the parallax between the first optical system and the finder optical system.

6 Claims, 2 Drawing Sheets

ZOOM CAMERA

BACKGROUND OF THE INVENTION

1. Field of the Invention

The present invention relates to a zoom camera of the type in which a photographic zoom lens system and a finder system are independently of each other. More particularly the invention relates to a zoom camera capable of automatically effecting the correction of a parallax in operative association with the extension of a zoom lens.

2. Description of the Prior Art

In the case of a camera in which the optical axis of a phototaking optical system and the optical axis of a finder optical system are spaced apart from each other, as, for example, a compact camera, the occurrence of a parallax or a deviation between the visual field of the phototaking lens and the finder's visual field is inevitable when taking close-ups including, for example, the photographing of a flower at very close range. The occurrence of such parallax causes a phenomenon, as, for example, shown in FIG. 3 in which the image actually taken deviates as indicated by a dotted-line frame with respect to the finder's visual field indicated by a solid-line frame. In the case of a camera incorporating a zoom lens, this parallax appears more eminently with an increase in the image magnification of the phototaking lens system.

Several attempts for correcting such parallax are known. These known methods include, for example, one by which the optical axis of the finder optical system is gradually inclined in mechanically operative association with the extension of the phototaking lens and another by which the visual field frame of the finder is moved mechanically in accordance with the focusing distance.

However, these conventional techniques are disadvantageous in that the whole or part of the finder optical system must be moved mechanically, thus inevitably complicating the internal mechanism of the camera. Therefore, cameras incorporating such parallax correction mechanism are generally expensive.

In order to overcome this deficiency, attempts have been made in which the finder screen is composed of electronic display means such as a liquid crystal display panel and the position and size of an image within the screen are electronically controlled thereby producing the effect of moving the image within the finder's visual field without any mechanical moving mechanism. Even with these method, it is still impossible to avoid an increase in the component parts of the cameras and the mechanism is not suited for use in inexpensive cameras. Also, any attempt to incorporate such parallax correction mechanism in a compact zoom camera requires that the amount of parallax be calculated in accordance with the focusing distance and the focal length and the image on the liquid crystal finder be correspondingly moved by an electronic control, thus making the construction extremely complicated.

In addition, there is another disadvantage that any type of the above-mentioned conventional parallax correction mechanisms has poor adaptability to the automatic focusing mechanisms generally used in the compact cameras. In other words, the conventional parallax correction mechanisms can function only upon the measurement of the distance to an object to be photographed with the result that in order to allow the parallax correction mechanism to function fully satisfactorily, the distance to the object must always be measured so as to continuously correct the parallax in accordance with the resulting information. Where this is not possible, extremely severe restrictions are imposed on the sequence of camara controls so that it is necessary to simultaneously perform the correction of the parallax and the extension of the phototaking lens while preliminarily measuring the distance to the object by half depressing the shutter release bottom. Moreover this series of operations must be completed prior to the operation of shutter release.

Thus, it will be seen that the conventional parallax correction mechanisms and automatic focusing mechanisms have poor adaptability to each other so that, as mentioned previously, in the case of the former mechanical-type mechanisms, there is the undesirable effect of greatly increasing the power consumption of the camera, whereas in the case of the latter electronic-type mechanisms the function becomes such that it is entirely meaningless to the ordinary users who are not skilled in the technique of half-depressing the shutter.

SUMMARY OF THE INVENTION

It is the primary object of the present invention to provide a zoom camera which overcomes the previously mentioned problems of the conventional parallax correction mechanisms, e.g., the restrictions from the camera control point of view and the great increase in the component parts, which is easy to operate by the ordinary users and which is capable of automatically effecting the desired parallax correction with a simple mechanism.

In accordance with a basic aspect of the present invention, there is thus provided a zoom camera including a first phototaking optical system having a plurality of optical lens means arranged along a first optical axis, a finder optical system arranged along a second optical axis spaced apart from the first optical axis, first moving means for moving at least a part of the optical lens means for the purpose of zooming, and second moving means for moving at least a part of the optical lens means in a direction inclined at a predetermined angle with respect to the first optical axis for the purpose of focusing independently of the first moving means, and in this case the angle is predetermined so as to correct the parallax between the first optical system and the finder optical system.

In accordance with a preferred aspect of the present invention the first and second optical axes are arranged substantially parallel to each other.

In accordance with another preferred aspect of the present invention the first optical system includes first optical lens means arranged at a position relatively remote from its focal surface and second optical lens means arranged at a position relatively near to the focal surface, the first optical lens means being moved by the first moving means and the second optical lens means being moved by the second moving means.

In accordance with still another preferred aspect of the present invention the second moving means includes guide means for moving the second optical lens means to guide it in the direction of the inclination.

In accordance with still another preferred aspect of the present invention the second optical lens means has an optical characteristic such that its movement produces substantially the same amount of change in the magnification as the amount of change in the focal length of the first optical system.

In accordance with still another preferred aspect of the present invention the following condition is satisfied $$1.2D/|f_a| < \tan\theta < 1.8D/|f_a| \quad (1)$$

where θ represents the angle of inclination, $f_a$ the focal length of the first optical system excluding the second optical lens means, and D the distance between the first and second optical axes.

In accordance with still another preferred aspect of the present invention, the first optical lens means is composed of a positive lens group, the second optical lens means is composed of a negative lens group, and the first optical system is formed to have a two-group zoom lens construction.

The above and other objects, features and advantages of the present invention will become more apparent from the following detailed description of its embodiments which are shown for illustrative purposes only without any intention of limitation when taken in conjunction with the accompanying drawings.

DESCRIPTION OF THE PREFERRED EMBODIMENTS

Figure 1:
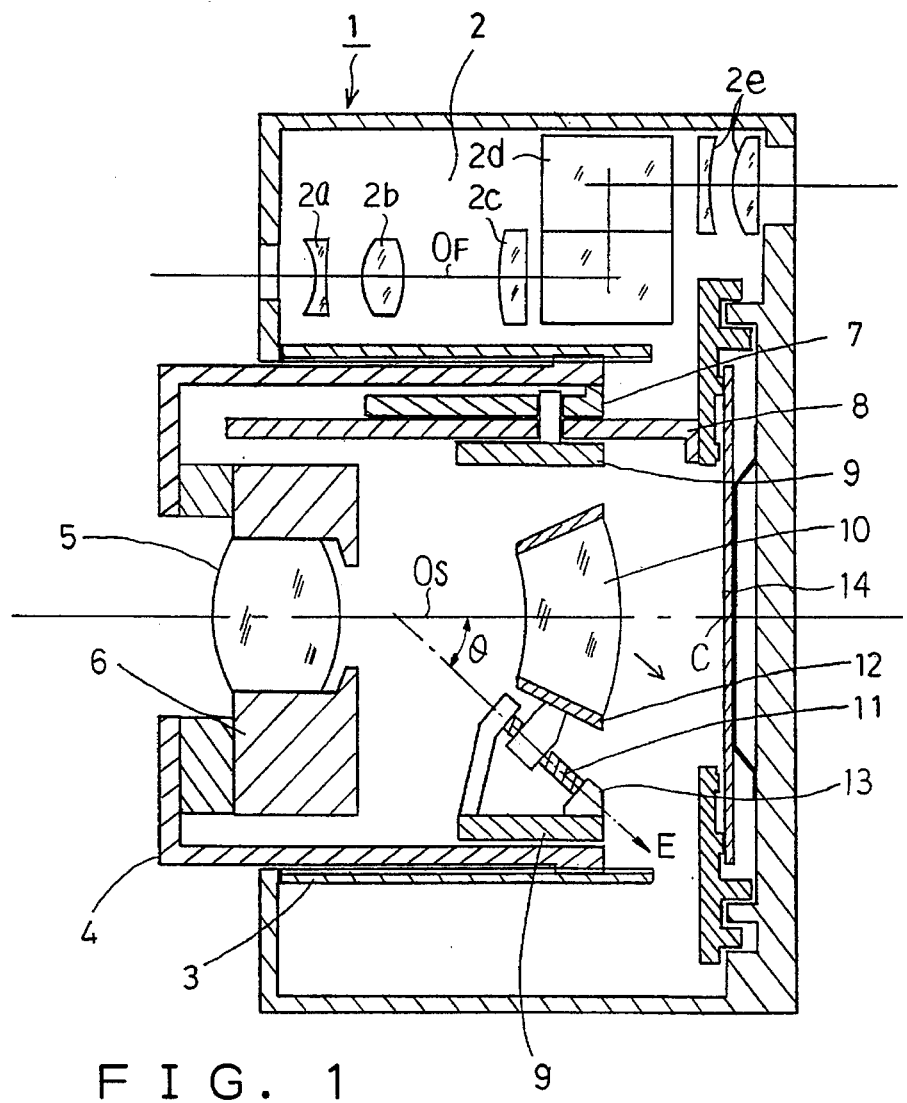
FIG. 1 shows the construction of principal parts of a zoom camera according to an embodiment of the present invention.
Figure 3:
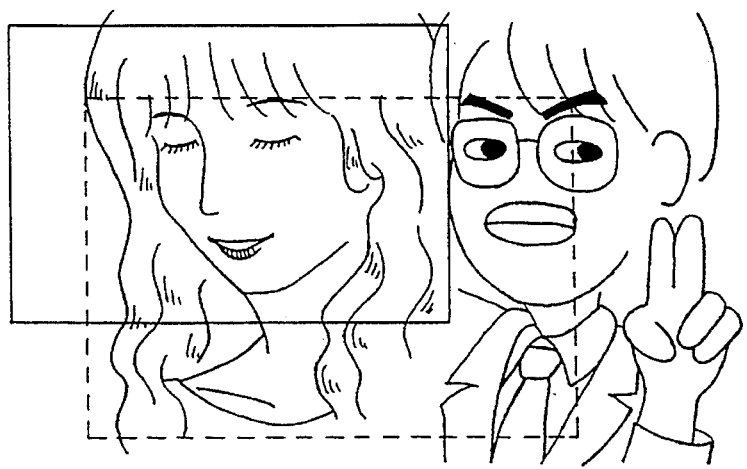
FIG. 3 shows the positional relation between the finder's visual field and an image to be photographed in the camera in which the optical axis of the phototaking optical system and the optical axis of the finder optical system are spaced in a parallel relation from each other.

Now describing an embodiment of the present invention with reference to FIG. 1, a camera body 1 is equipped with a photographic zoom lens (5, 10) and a finder 2 arranged above the zoom lens, and a focal surface 14 for placing a sensitive film thereon is positioned on the rear side of the zoom lens. The zoom lens is a two-group zoom lens including a positive front lens group 5 (first optical lens means) and a negative rear lens group 10 (second optical lens means) and its optical axis is designated by a symbol $O_s$.

The finder 2 includes, as arranged in order from the front side, an objective lens composed of three lenses, i.e., a negative lens 2a, a positive lens 2b and a positive lens 2c, a Porro prism 2d for obtaining a correct image and an eyepiece lens group 2e, thus forming a real-image finder. With this finder 2, the magnification is varied by varying the lens spacing of the objective lens group. The optical axis $O_F$ of the finder 2 is substantially parallel to the optical axis $O_s$ of the zoom lens.

The front lens group 5 of the zoom lens is fastened to a straight helicoid barrel 4 which forms first moving means along with a shutter unit 6, and the barrel 4 is moved in the direction of the optical axis $O_s$ by the rotation of a rotation helicoid 3 whose relative movement in the direction of the optical axis $O_s$ of the zoom lens is regulated with respect to the camera body 1, thereby effecting a zoom.

A lens barrel 9 of the rear lens group 10 is moved by a cam cylinder 7 forming second moving means. The cam cylinder 7 is fastened to the barrel 4 so that it is rotated in operative association with the helicoid 3. The lens barrel 9 is engaged with the cam cylinder 7 and a cam guide 8 secured to the camera body 1 by pins which are not shown so that it makes a non-linear displacement in the direction of the optical axis $O_s$ in response to the rotation of the helicoid 3. In this way, the spacing between the front and rear lens groups 5 and 10 is varied by the rotation of the helicoid 3 and thus the focal length of the zoom lens is adjusted.

Particularly, the rear lens group 10 of the zoom lens is supported on an arm 12 and the arm 12 is threadedly engaged with a feed screw 11 which serves as a guide member for transmitting the movement of the lens barrel 9 in a direction E inclined at an angle θ with respect to the optical axis $O_s$ during the focusing operation. As a result, the rear lens group 10 is moved in the withdrawing direction E inclined from the optical axis $O_s$ along the feed screw 11 in response to the movement of the lens barrel 9 in the direction of the optical axis $O_s$.

The feed screw 11 is supported at the position of attachment of the lens barrel 9 and is rotated by a drive unit 13 including a motor and a reduction mechanism. The rotation of the feed screw 11 causes the rear lens group 10, threadedly engaged with the feed screw 11, to move in the axial direction E of the feed screw 11. The feed screw 11 is inclined by the given angle θ with respect to the optical axis $O_s$ of the zoom lens. Thus, in response to an amount of movement Δx of the lens barrel 9 in the direction of the optical axis $O_s$, the rear lens group 10 of the zoom lens is moved to a position apart by a distance a in a perpendicular direction from the optical axis $O_s$ simultaneously with the movement in the direction of the optical axis $O_s$ and thus the correction of the parallax between the photographic zoom lens and the finder optical system is effected simultaneously with the adjustment of the focal length.

It is to be noted that while, excepting the feed screw 11, other members having guide functions are not shown in FIG. 1, it is needless to say that a plurality of members having guide functions but not shown are preferably provided in addition to the feed screw 11 so as to ensure the desired moved position accuracy of the lens barrel 9.

In the construction of the focusing mechanism shown by the present embodiment, the rear group lens barrel is obliquely moved by the rotation of the feed screw which serves concurrently the guide function and the focusing, so that the construction may also served concurrently as a so-called collapsible barrel mechanism.

Figure 2:
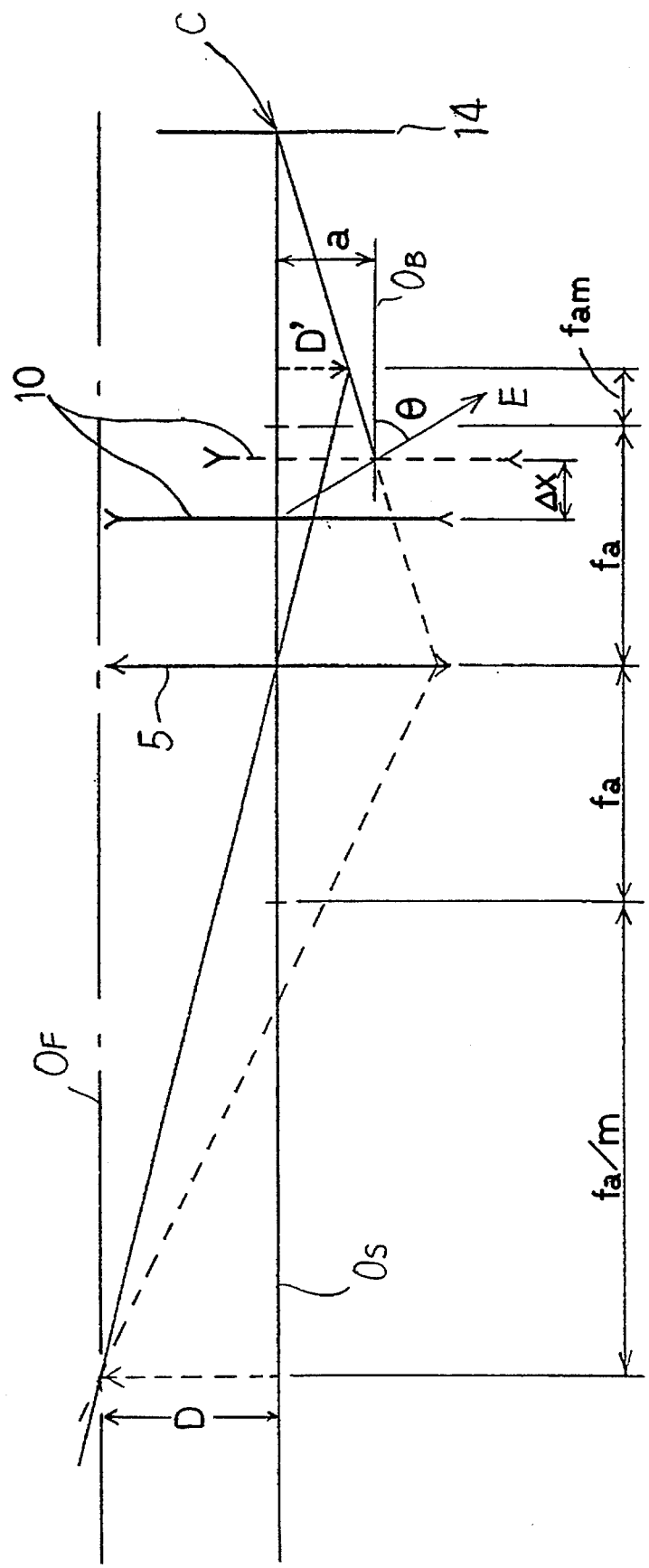
FIG. 2 shows schematically the function of the zoom camera according to the embodiment of the present invention.

Referring now to FIG. 2, there is schematically illustrated the operating principle of the above-described embodiment. In the Figure, the component parts corresponding to the counterparts of FIG. 1 are designated by the same reference numerals and the optical axis $O_s$ of the photographic zoom lens and the optical axis $O_F$ of the finder are arranged parallel to each other. In the case of the camera in which the optical axis $O_s$ of the zoom lens and the optical axis $O_F$ of the finder are apart by a distance D in the short dimension direction of a picture to be photographed (in the vertical direction of the Figure plane), a parallax corresponding to the image magnification and the distance D is caused in the short range photographing although no parallax is present at infinity.

Thus, if the rear lens group 10 forming the focusing lens group of the phototaking lens system of a so-called rear focusing type is obliquely extended in the direction E tending to move it away from the finder optical axis $O_F$ so that the beam of light from an object on the finder optical axis $O_F$ is focused at a film center C through the zoom lens, the parallax of the finder can be corrected completely.

In the discussion to be followed in reference to FIG. 2, it is assumed that in order that the correspondence to FIG. 1 may be ensured, the zoom lens is of a two-group construction including the positive front lens group 5 and the negative rear lens group 10 and the lens groups 5 and 10 are each composed of thin lenses. It is to be noted that the direction of deviation between the optical axis $O_s$ of the zoom lens and the optical axis $O_F$ of the finder is selected to be the short dimension direction of a picture to be photographed for the purpose of reducing to a minimum limit the increase in the value of an image circle which is required in a photographing condition at the closest focusing distance due to the deviation of the optical axis $O_s$ of the zoom lens from the film center C. Any extreme increase in the image circle is not desirable since it imposes many restrictions on the designing of the photographic zoom lens.

In the case of the rear focusing type, the amount of extension $\Delta x$ is generally given approximately by the following equation if $f_a$ represents the focal length of the positive front lens group 5, $\beta$ the magnification of the rear lens group 10 serving as a focusing lens group, m the image magnification of the front lens group 5 and $f (=f_a\beta)$ the focal length of the whole zoom lens system $$\Delta x = (m/f_a) * |f^2/(\beta^2 - 1)| \quad (2)$$

On the other hand, the magnitude D' of an image of an object on the finder optical axis $O_F$ produced by the front lens group 5 is given by the following equation in accordance with the distance D between the optical axis $O_s$ of the zoom lens and the finder optical axis $O_F$ $$D' = m * D \quad \ldots (3)$$

In this case, if the optical axis $O_B$ of the rear lens group 10 is on an extension of the straight line connecting the film center C and D', it can be considered that the object on the finder optical axis $O_F$ is focused at the film center C and therefore the amount of displacement a of the optical axis $O_B$ of the rear lens group 10 with respect to the optical axis $O_s$ is given by the following equation $$a = D' * \beta/(\beta - 1) \quad (4)$$

Substituting equation (3) into equation (4), the following equation is obtained $$a = m * D * \beta/(\beta - 1) \quad (5)$$

Also, the angle of inclination e in the extension of the rear lens group 10 is given by the following equation $$\tan \theta = a/\Delta x \quad (6)$$

Therefore, the following equation is obtained from equations (2), (5) and (6)

$$\tan \theta = |(1+\beta)/\beta| * (D/f_a) \quad (7)$$

Generally the magnification $\beta$ of the rear lens group 10 in the zoom lens of the two-group construction of the positive and negative lens groups is on the order of 1.2 to 4.0 and therefore the angle of inclination $\theta$ does not vary considerably in this range. Thus, by substituting this condition ($1.2 < \beta < 4$) into equation (7), it is possible to obtain the following expression $$1.25 D/|f_a| < \tan \theta < 1.833 D/|f_a|) \quad (8)$$

Therefore, practically the previously mentioned expression (1) or the following expression can be determined as a conditional expression $$1.2 D/|f_a| < \tan \theta < 1.8 D/|f_a|) \quad (8)$$

This expression (1) indicates the range of parallaxes which can be practically corrected and exceeding these upper and lower limits has the undesirable effect of increasing the resulting parallax at the closest focusing distance.

It will be seen from the foregoing that in accordance with the present embodiment, the photographic zoom lens automatically corrects a parallax in operative association with its extension with respect to the finder whose optical axis is fixed relative to the camera body. Thus, the parallax is corrected irrespective of the posture of the camera and this is extremely advantageous from the camera control point of view.

Further, in accordance with the present embodiment, as mentioned previously, the correction of a parallax can be effected by simply extending the rear focusing lenses of the photographic zoom lens mechanically along the axis (the guide member) having the given inclination with the result that practically all the existing component structures of the lens focusing mechanism can be used and thus it is possible to obtain a zoom camera having a parallax correcting function without increasing the component parts of the camera.

What is claimed is:

1. A zoom camera comprising:

a first optical system for phototaking including a plurality of optical lens groups arranged along a first optical axis;

a finder optical system arranged along a second optical axis spaced apart from said first optical axis;

first moving means for moving at least a first of said optical lens groups along said first optical axis for zooming; and second moving means for moving at least a second of said optical lens groups in a direction inclined at a predetermined angle with respect to said first optical axis for focusing independently of said first moving means, said angle being predetermined to correct a parallax between said first optical system and said finder optical system;

wherein the following condition is satisfied:

$$1.2 D/|f_a| < \tan \theta < 1.8 D/|f_a|$$

where $\theta$ is said predetermined angle, $f_a$ is the focal length of said first optical system excluding said second of said optical lens groups, and D is the distance between said first optical axis and said second optical axis.

2. A zoom camera according to claim 1, wherein said first optical axis and said second optical axis are arranged substantially parallel to each other.

3. A zoom camera according to claim 1, wherein said first of said optical lens groups is arranged at a position remote from a focusing surface of said first optical system, and said second of said optical lens groups is arranged at a position near said focusing surface.

4. A zoom camera according to claim 1, wherein said second moving means includes guide means for moving and guiding said second of said optical lens groups in the direction inclined at said predetermined angle.

5. A zoom camera according to claim 1, wherein said second of said optical lens groups has an optical characteristic such that a movement of said second of said optical lens groups causes an amount of change in magnification which is substantially equal to an amount of change in a focal length of said first optical system.

6. A zoom camera according to claim 1, wherein said first of said optical lens groups comprises a positive lens group, said second of said optical lens groups comprises a negative lens group, and said first optical system is formed so as to have a two-group zoom lens construction.

* * * * *